US007035765B2

(12) United States Patent
Tanahashi (10) Patent No.: US 7,035,765 B2
(45) Date of Patent: Apr. 25, 2006

(54) DISASTER PREDICTING METHOD, DISASTER PREDICTING APPARATUS, DISASTER PREDICTING PROGRAM, AND COMPUTER-READABLE RECORDING MEDIUM RECORDED WITH DISASTER PREDICTING PROGRAM

(75) Inventor: Shuichi Tanahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 10/341,479

(22) Filed: Jan. 14, 2003

(65) Prior Publication Data

US 2003/0212493 A1 Nov. 13, 2003

(30) Foreign Application Priority Data

Mar. 26, 2002 (JP) ............................. 2002-086659

(51) Int. Cl.
*G06F 11/30* (2006.01)

(52) U.S. Cl. .............................. 702/183; 702/2; 702/3; 702/182; 702/184; 702/185; 709/200; 709/206; 709/217; 709/218

(58) Field of Classification Search .................. 702/21, 702/183; 709/200, 206, 217, 218; 706/931, 706/928, 930; 340/540; 342/268; 382/100, 382/103, 162, 165, 168, 170, 181
See application file for complete search history.

(56) References Cited

U.S. PATENT DOCUMENTS

| 5,910,763 | A  | * | 6/1999  | Flanagan ............... 340/286.02 |
|-----------|----|---|---------|-------------------------------------|
| 6,128,578 | A  | * | 10/2000 | Sakaino et al. ................ 702/3 |
| 6,340,946 | B1 | * | 1/2002  | Wolfson et al. ........... 342/26 R |
| 6,581,008 | B1 | * | 6/2003  | Intriligator et al. ............ 702/3 |
| 6,670,908 | B1 | * | 12/2003 | Wilson et al. ............ 342/26 R |
| 6,816,878 | B1 | * | 11/2004 | Zimmers et al. ............ 709/200 |
| 2001/0052562 | A1 | * | 12/2001 | Ishihara et al. ............. 244/175 |
| 2002/0041328 | A1 | * | 4/2002  | LeCompte et al. ......... 348/144 |
| 2002/0055820 | A1 | * | 5/2002  | Scannell ........................ 702/3 |
| 2002/0091488 | A1 | * | 7/2002  | Baron et al. .................... 702/3 |
| 2002/0107638 | A1 | * | 8/2002  | Intriligator et al. ............ 702/3 |
| 2003/0025627 | A1 | * | 2/2003  | Wilson et al. ................ 342/26 |
| 2003/0069002 | A1 | * | 4/2003  | Hunter et al. ............... 455/404 |
| 2003/0220740 | A1 | * | 11/2003 | Intriligator et al. ............ 702/3 |
| 2004/0044445 | A1 | * | 3/2004  | Burdon ......................... 701/3 |
| 2004/0183695 | A1 | * | 9/2004  | Ruokangas et al. ......... 340/945 |
| 2004/0236676 | A1 | * | 11/2004 | Takezawa et al. ............ 705/38 |
| 2004/0267577 | A1 | * | 12/2004 | Nakai .............................. 705/4 |
| 2005/0010365 | A1 | * | 1/2005  | Chapman et al. .............. 702/3 |
| 2005/0085257 | A1 | * | 4/2005  | Laird et al. .............. 455/550.1 |

* cited by examiner

*Primary Examiner*—Carol S. W. Tsai
(74) *Attorney, Agent, or Firm*—Staas & Halsey LLP (57) ABSTRACT

A disaster predicting method, a disaster predicting apparatus, a disaster predicting program, and a computer-readable recording medium recorded with a disaster predicting program, which automatically order satellite image data based on periodically observed or predicted natural phenomenon, and also automatically analyze the obtained satellite image data to predict a disaster, thereby enabling to deal promptly with a disaster.

12 Claims, 6 Drawing Sheets

| TIME (YYYYMMDDhhmm) | DESIRED POSITION COORDINATES FOR TAKING SATELLITE IMAGE (LATITUDE, LONGITUDE) | TYPE OF SATELLITE IMAGE DATA |
|---|---|---|
| 200108150100 | 139.56, 35.48 | SATELLITE A (code=nnn) |

| TYPE OF PREDICTED DISASTER (CODE) | DISASTER CENTER POSITION COORDINATES (LATITUDE, LONGITUDE) | ABNORMAL LEVEL VALUE | DELIVERY ADDRESS CODE No. |
|---|---|---|---|
| LANDSLIDE (CODE: 100) | 139.56, 35.48 | 143 | 12 |

FIG.6

DISASTER PREDICTING METHOD, DISASTER PREDICTING APPARATUS, DISASTER PREDICTING PROGRAM, AND COMPUTER-READABLE RECORDING MEDIUM RECORDED WITH DISASTER PREDICTING PROGRAM

FIELD OF THE INVENTION

The present invention relates to a technique for predicting a local disaster by utilizing satellite image data obtained by remotely sensing the earth surface.

RELATED ART OF THE INVENTION

Plans are in progress to utilize remotely sensed satellite image data for disaster contingency planning. Also, recently, it has become possible to privately use high resolution satellite image data, and an infrastructure is being prepared for disaster contingency planning.

However, for disaster contingency planning, since it is necessary for a specialist to interpret and analyze the latest satellite image data, a real time processing is not possible. Moreover, there are only a few organizations that can independently receive the satellite image data, and generally, the satellite image data is obtained from a provider of satellite image data. In this case, in order to obtain satellite image data of a satellite orbiting a polar orbit, it is necessary to place an advance order with the provider to take images, and hence it is difficult to obtain the latest satellite image data. Therefore, it takes some time to obtain and analyze the satellite image data, and it is difficult to deal promptly with a disaster.

The present invention has been accomplished in view of the abovementioned conventional problems, and has an object to provide a disaster predicting technique for automatically placing an advance order with the provider to take images or ordering satellite image data based on periodically observed or predicted natural phenomenon, and automatically analyzing the obtained satellite image data to predict a disaster, thereby enabling to deal promptly with the disaster.

SUMMARY OF THE INVENTION

In order to achieve the above object, in a disaster predicting technique according to the present invention, when an attribute value of a periodically observed or predicted natural phenomenon exceeds a predetermined threshold, a delivery request is sent for satellite image data of remotely sensed natural phenomenon related to the attribute value in an area including a location where the attribute value is observed or predicted. Then, when delivery of the satellite image data related to the delivery request is received, disaster predicted areas which are predicted to have disasters caused by natural phenomenon related to the attribute value which exceeds the threshold, are extracted based on differential image data between the satellite image data and standard satellite image data. Thereafter, for each of the extracted disaster predicted areas, an index showing the risk of disaster is calculated based on attribute values of respective pixels which constitute the differential image data, and when the index exceeds a predetermined threshold, a possibility of disaster in the disaster predicted area is notified.

According to this constitution, it becomes possible to automatically perform processes of from monitoring a periodically observed or predicted natural phenomenon to generating an alert, and also, based on high resolution satellite image data, a private use of which has recently become possible, a disaster can be predicted with high accuracy. Therefore, a jurisdiction administrative body that received a disaster alert, can promptly deal with the disaster, thus enabling damages caused by the disaster to be kept to a minimum.

Moreover, when there is a disaster report from a disaster site, a delivery request may be sent for satellite image data of remotely sensed natural phenomenon related to the disaster report in an area including a location related to the disaster report. In this way, even when a natural phenomenon related to a disaster is not observed or predicted, the disaster report from the disaster site can be effectively utilized, enabling to deal with a disaster with more promptly.

Furthermore, when calculating the index showing the risk of disaster, the index may be calculated, by excluding pixels of which attribute values are equal to or less than a predetermined threshold from among pixels which constitute the differential image data. Thus, an error due to noise is excluded, enabling to judge the risk of disaster with high accuracy.

In addition, when notifying of the possibility of disaster, an alert mail including a disaster type and a position of the disaster predicted area may be sent. At this time, differential image data of the area including the disaster predicted area may be attached to the alert mail. Thus, if the alert mail is sent, it is possible to notify that there is the possibility of disaster, even to a remote location. Moreover, if the differential image data is attached to the alert mail, it is possible to easily understand the location where the disaster is predicted.

Other objects and aspects of this invention will become apparent from the following description of embodiments, in conjunction with the appended drawings.

PREFERRED EMBODIMENT

Hereunder is a detailed description of the present invention, with reference to the appended drawings.

Figure 1:
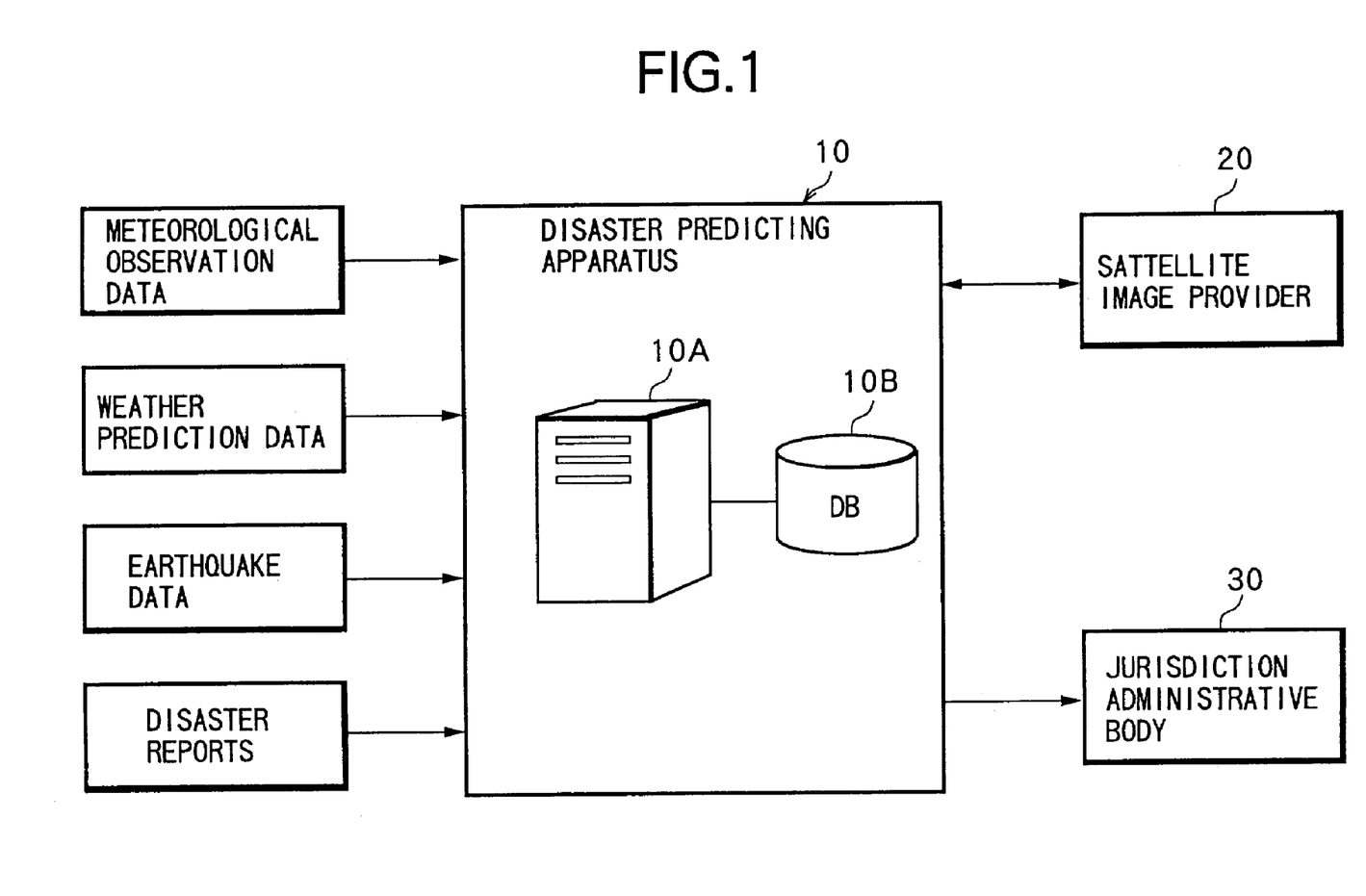
FIG. 1 is a block diagram for generating an alert using a disaster predicting apparatus of the present invention.

FIG. 1 shows a constitution in which a disaster predicting apparatus that has embodied a disaster predicting technique according to the present invention is used, for example to generate an alert to a jurisdiction administrative body of an area where a disaster is predicted.

A disaster predicting apparatus 10 comprises a computer 10A provided with at least a central processing unit (CPU) and a memory. Various kinds of functions related to disaster prediction are realized by a program loaded into the memory. Moreover, a DB (database) 10B in which various tables described later are registered, is connected to the computer 10A. Also, the disaster predicting apparatus 10, as shown in the figure, is input with meteorological observation data, weather prediction data, earthquake data and the like, as periodically observed or predicted natural phenomenon. Moreover, the disaster predicting apparatus 10 is input with disaster reports from disaster sites (including information specifying the location of disaster), at any time, for example via the Internet. Furthermore, the disaster predicting apparatus 10 is connected through a network, with a provider which delivers satellite image data (hereunder called a satellite image provider) 20, and a jurisdiction administrative body 30 such as various ministries.

Moreover, the computer 10A realizes; a step of sending a delivery request for satellite image data, a step of extracting disaster predicted areas, a step of calculating an index showing the risk of disaster, a step of notifying that there is a possibility of disaster, means for sending a delivery request, means for extracting disaster predicted areas, means for calculating an index, means for notifying an occurrence of disaster, a function for sending a delivery request, a function for extracting disaster predicted areas, a function for calculating an index, and a function for notifying an occurrence of disaster.

Here, the meteorological observation data is delivered through the network from a meteorological service support center or a private meteorological company, as automated meteorological data acquisition system (AMeDAS) data. Also, the weather prediction data and earthquake information are similarly delivered from the meteorological service support center through the network. As general meteorological data delivered from the meteorological service support center, there are tsunami and earthquake information, volcanic information, alerts/warnings, meteorological information, various forecasts, long-range forecasting material, observation broadcasting reports, automated meteorological data acquisition system (AMeDAS) data, special weather information, aviation weather material, ocean and meso-numerical weather prediction models, quantitative material and the like.

Figure 2:
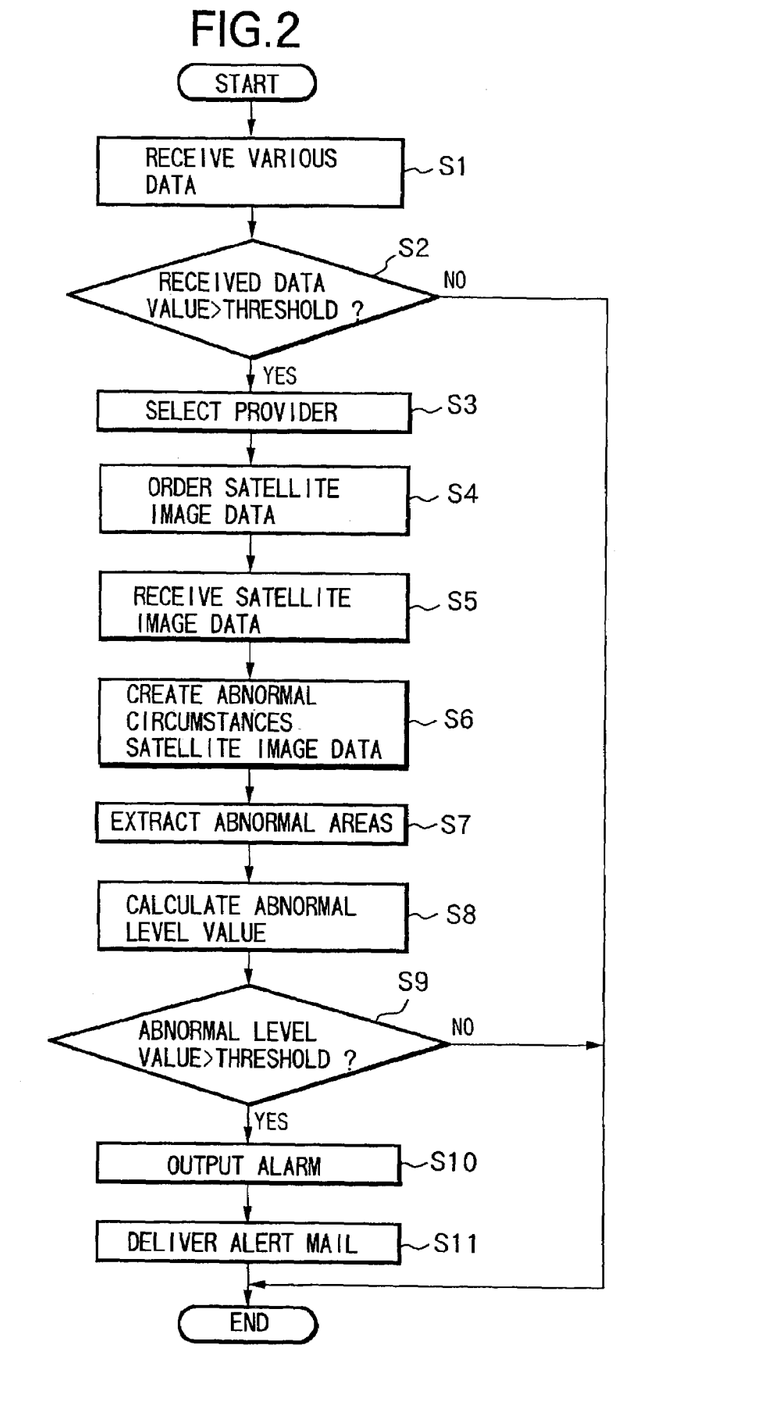
FIG. 2 is a flow chart showing the process contents in the disaster predicting apparatus.

FIG. 2 shows the process contents to be repeatedly executed at each predetermined time in the disaster predicting apparatus 10.

In step 1 (abbreviated to "S1" in the figure, and similarly hereunder), various observation data such as meteorological observation data, weather prediction data, and earthquake data, that are periodically observed or predicted, are received.

In step 2, it is judged if prediction or observation values (attribute values) of the received various observation data, exceed predetermined thresholds. That is, a table shown in Table 1 registered in the DB 10B is referred to, so that the thresholds related to elements (natural phenomenon) such as hourly precipitation, daily precipitation integrated value, maximum wind speed, daily maximum temperature, minimum atmospheric pressure, and seismic intensity, are extracted. Next, for each of the elements, it is judged if the value exceeds the threshold. Then, if the value exceeds the threshold (Yes), control proceeds to step 3. On the contrary, if the value is equal to or less than the threshold (No), the process is terminated. For the respective elements, as is clear from the table, a predicted disaster and a satellite used for taking the images for the satellite image data are related with each other. When there is a disaster report from a disaster site, even if the observation value is equal to or less than the predetermined threshold, it is preferable that control proceeds to step 3.

TABLE 1

| Item Number | Observation Element | Details of Observation Element | Threshold | Predicted Disaster | Satellite Used |
|---|---|---|---|---|---|
| 1 | Precipitation | Hourly precipitation | 50 mm/h | Flood | Satellite A |
| 2 | Precipitation | Daily precipitation integrated value | 200 mm/d | Landslide | Satellite B |
| 3 | Wind speed | Maximum wind speed | 20 m/s | Marine perils | Satellite B |
| 4 | Temperature | Daily maximum temperature | 40 ° C. | Vegetative disaster | Satellite C |
| 5 | Atmospheric pressure | Minimum atmospheric pressure | 970 hPa | Rainstorm | Satellite D |
| 6 | Earthquake | Seismic intensity | | Building collapse | Satellite B |

In step 3, a table shown in Table 2 registered in the DB 10B is referred to, so that, based on the satellite image data related to the observation elements (abnormal observation elements) of which the observation values exceed the thresholds, the most suitable satellite image provider 20 is selected. The table shown in Table 1 may be referred to again, so that the most suitable satellite image provider is selected, based on the used satellite related to the abnormal observation elements.

TABLE 2

| Observation Element | Satellite Image Data | Observation Conditions |
|---|---|---|
| Precipitation | Satellite D-visible/infrared composite image (cloud identifying image) | Observable cloud condition regardless of daytime or nighttime |
| Precipitation | Satellite A-ground flood determining image | Observable under cloudy sky regardless of daytime or nighttime |
| Precipitation | Satellite E-high resolution image (visible image) | Detailed observation of earth surface in daytime |
| River level | Satellite A-ground flood determining image | Observable under cloudy sky regardless of daytime or nighttime |
| Daily maximum temperature | Satellite F-continent: temperature image | Detailed observation of earth surface in daytime |
| Snowfall | Satellite F-continent: snow determining image | Detailed observation of earth surface in daytime |
| Monthly average of abnormal high temperature | Satellite F-sea surface temperature image | Detailed observation of sea surface in daytime |
| Wind speed | Satellite D-wind vector image | Observable in clouds regardless of daytime or nighttime |
| Earthquake | Satellite A-ground interferometric image | Observable under cloudy sky regardless of daytime or nighttime |

Figure 3:
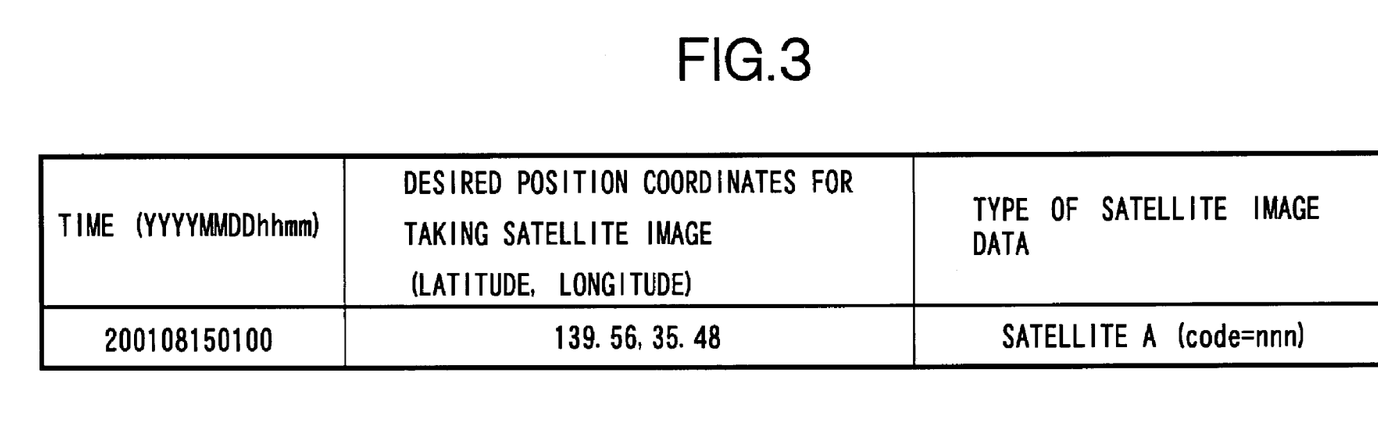
FIG. 3 is a diagram for explaining a delivery request mail.

In step 4, the time and position (latitude and longitude) where the observation values exceed the thresholds are extracted from the various observation data. Then, based on the extracted time, position and used satellite, a delivery request mail to the satellite image provider 20, as shown in FIG. 3, is created, to be sent to the selected satellite image provider 20. At this time, it is preferable that the delivery request mail is able to be automatically processed by a computer, by previously deciding a format thereof. On the other hand, in the satellite image provider 20 that has received the delivery request mail, an image taking plan is conducted based on the time, the position and the type of satellite image data included in the delivery request mail, and the latest satellite image data is taken for an area including a location where the abnormal observation elements are observed (hereunder called the abnormal observation location).

A series of processes shown in step 1 through step 4 respectively correspond to a step of sending a delivery request for satellite image data, means for sending a delivery request for satellite image data, and a function for sending a delivery request for satellite image data.

In step 5, satellite image data from the satellite image provider 20 is received.

In step 6, a table shown in Table 3 registered in the DB 10B is referred to, so that image data (hereunder called "abnormal circumstances satellite image data") corresponding to the reported elements which predict the disaster, is created from the satellite image data.

TABLE 3

| Reported element | Satellite image data | Observation conditions |
| --- | --- | --- |
| Sea surface contamination | Satellite A-water quality determining image of sea surface | Observable under cloudy sky regardless of daytime or nighttime |
| Landslide | Satellite F-high resolution image (visible image) | Detailed observation of earth surface in daytime |

Figure 4:
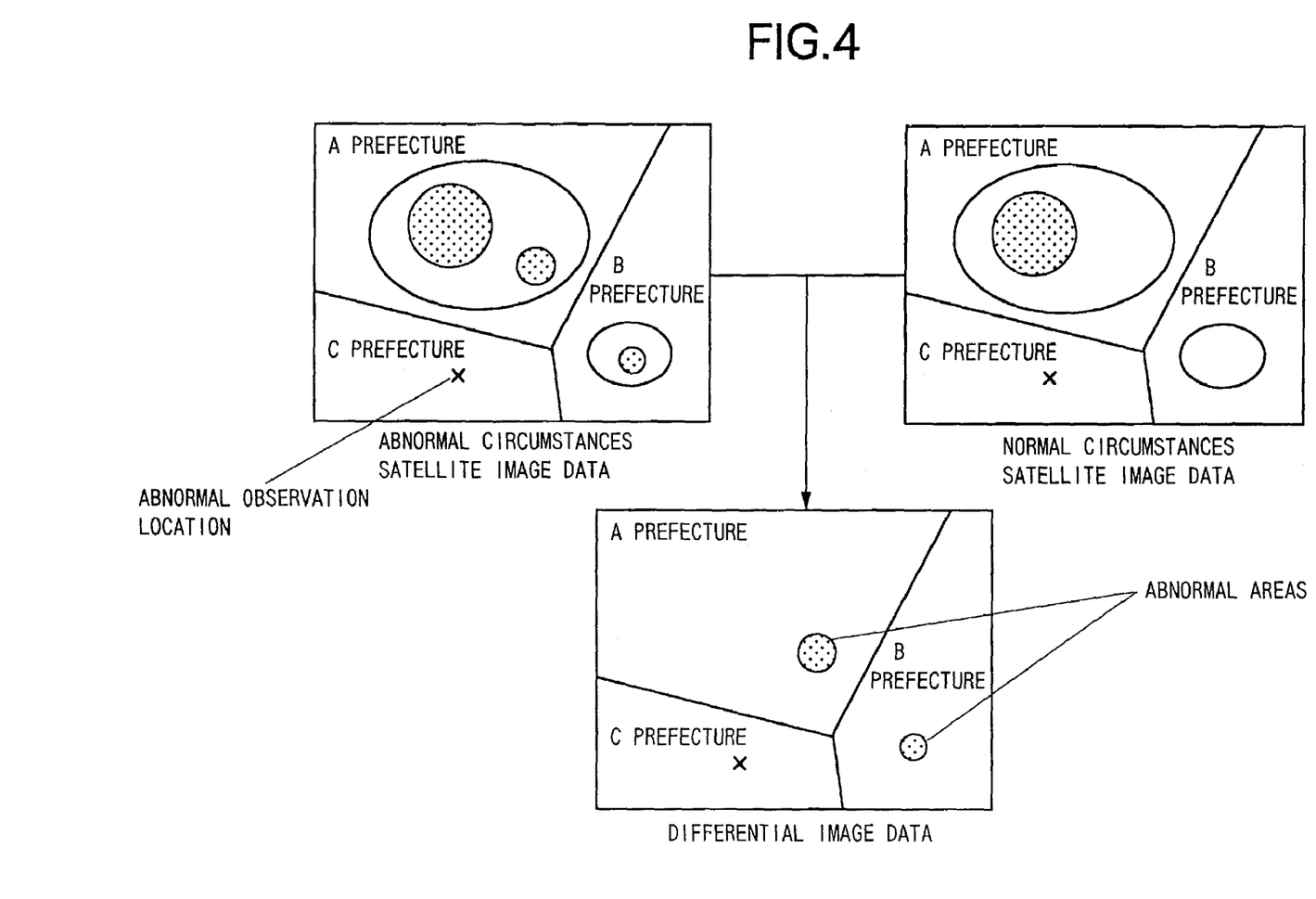
FIG. 4 is a diagram for explaining a method of creating differential image data.

In step 7, in order to extract disaster predicted areas (hereunder called "abnormal areas"), as shown in FIG. 4, differential image data which takes a difference between abnormal circumstances satellite image data and normal circumstances satellite image data, is created. Here, the normal circumstances satellite image data is registered in the DB 10B for each predetermined area, in a state related to the respective reported elements. The example shown in the figure shows that disaster predicted areas exist in A prefecture and B prefecture. It is preferable that the abnormal circumstances satellite image data and the normal circumstances satellite image data are used after subjected to predetermined location correction and intensity correction, so as to be able to be compared with each other under the same condition.

A series of processes shown in step 5 through step 7 respectively correspond to a step of extracting disaster predicted areas, means for extracting disaster predicted areas and a function for extracting disaster predicted areas.

In step 8, for each of the extracted abnormal areas, an abnormal level value (index) showing the risk of disaster is calculated. That is, a predetermined calculation is applied to attribute values of respective pixels which constitute the abnormal area, other than attribute values considered to be errors due to noise, to calculate the abnormal level value. Here, for the abnormal level value, a value calculated by an existing statistical method may be used so as to show the risk of disaster, via image characteristics of the abnormal area. The process shown in step 8 corresponds to a step of calculating an index showing the risk of a disaster, means for calculating an index showing the risk of a disaster, and a function for calculating an index showing the risk of a disaster.

In step 9, it is judged whether or not the abnormal level value exceeds a predetermined threshold. Then, in the case where the abnormal level value exceeds the threshold, control proceeds to step 10 (Yes), while in the case where the abnormal level value is equal to or less than the threshold (No), the process is terminated.

In step 10, an alarm is output to a console (not shown in the figures).

Figure 5:
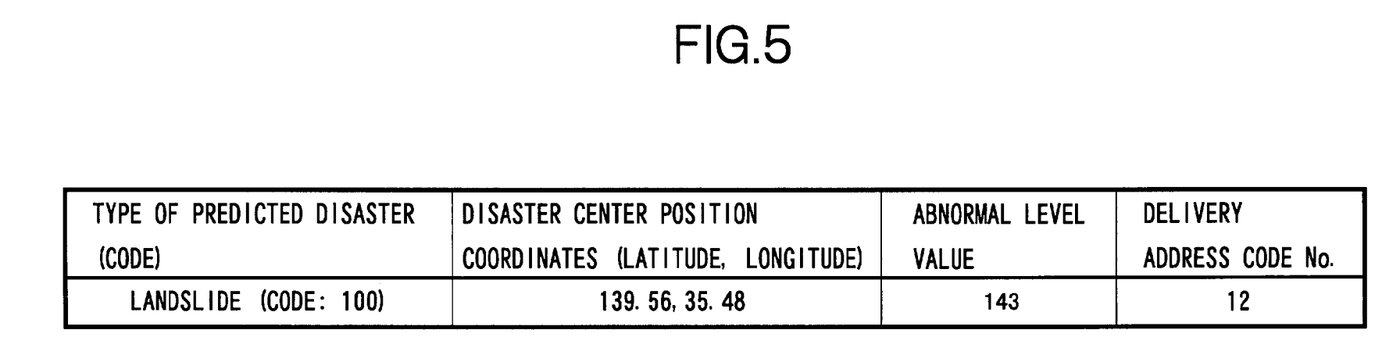
FIG. 5 is a diagram for explaining an alert mail.

In step 11, a table shown in Table 4 registered in the DB 10B is referred to, so that an alert mail as shown in FIG. 5 is sent to the administrative body having jurisdiction over the area where the abnormal level value exceeds the threshold. The alert mail comprises, as shown in the figure, the type of predicted disaster, the disaster center position coordinates, the abnormal level value, and the delivery address code No. At this time, it is preferable to attach the differential image data to the alert mail, so that it becomes easier to understand the disaster predicted areas.

A series of processes shown in step 9 through step 11 respectively correspond to a step of notifying a possibility of disaster, means for notifying a possibility of disaster, and a function for notifying a possibility of disaster.

TABLE 4

| Code No. | Jurisdiction Area | Jurisdiction Administrative Body | Mail Address |
| --- | --- | --- | --- |
| 1 | East longitude 140°–142° North latitude 35°–37° | A prefecture Disaster Prevention Center | aaa@xxx.com |
| 2 | East longitude 140°–141° North latitude 35°–36° | B city hall Disaster Prevention Center | bbb@yyy.com |
| 3 | East longitude 135°–140° North latitude 35°–39° | X ministry Disaster Prevention Center | ccc@zzz.com |
| . | . | . | . |
| . | . | . | . |
| . | . | . | . |

According to such a constitution, when the observation value of various observation data periodically observed or predicted exceeds a predetermined threshold, or when there is a disaster report from a disaster site, the satellite image data of the area including the location related to the observation value or the disaster report is automatically ordered. Then, the satellite image data delivered from the satellite image provider 20, and the normal circumstances satellite image data are compared with each other, to create differential image data which takes a difference therebetween. The differential image data represents a difference (change) from the normal circumstances. Hence, an abnormal area of a predicted disaster can be specified. For each of the abnormal areas, the abnormal level value showing the risk of disaster is calculated, and when this value exceeds the predetermined threshold, an alarm is output to the console, and the alert mail is sent to the corresponding jurisdiction administrative body 30.

Figure 6:
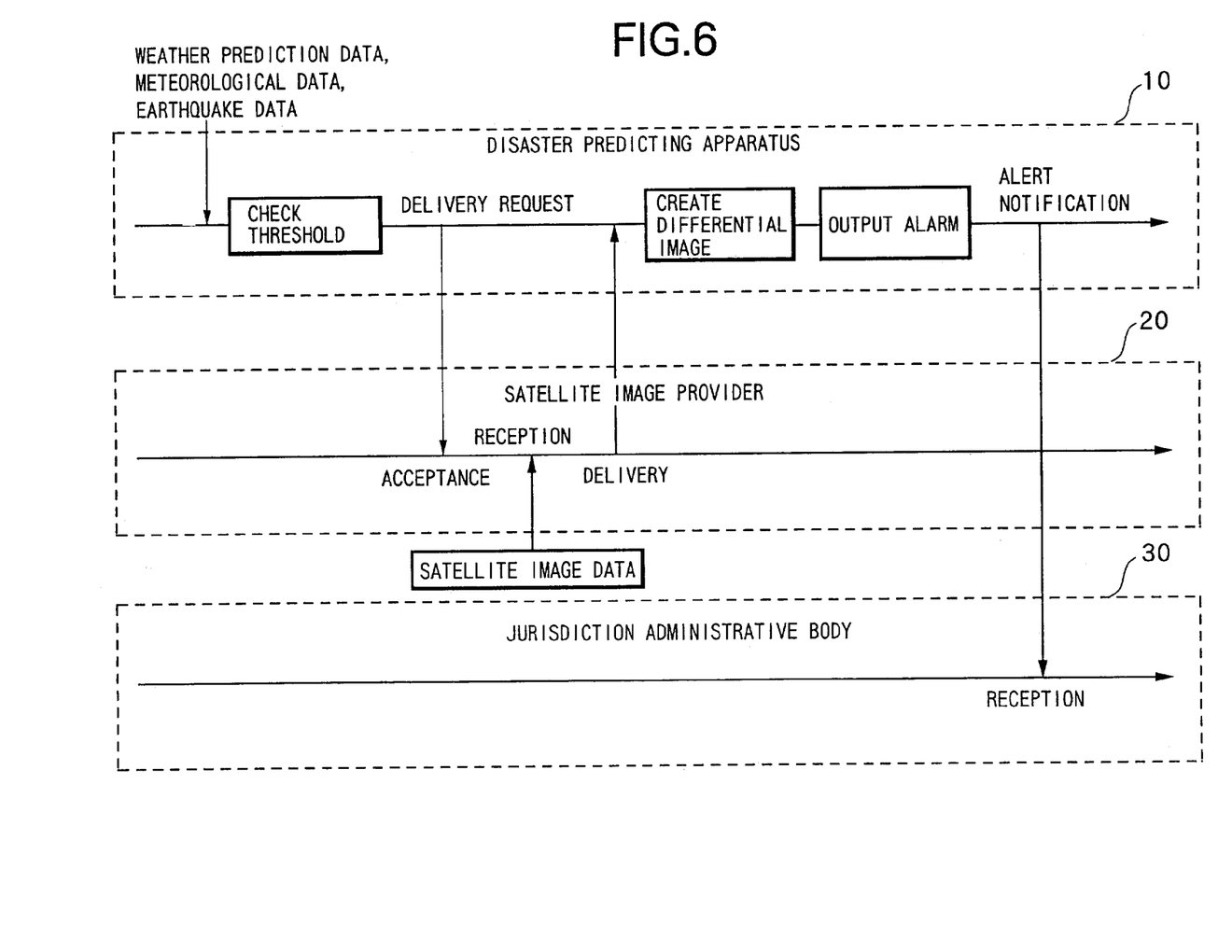
FIG. 6 is a time chart of from monitoring various kinds of observation data to generating of an alert.

Consequently, as shown in FIG. 6, it becomes possible to automatically perform the processes of from monitoring various observation data to generating an alert, and also, based on high resolution satellite image data, a private use of which has recently become possible, a disaster can be predicted with high accuracy. Therefore, the jurisdiction administrative body 30 that received the disaster alert, can promptly deal with the disaster, thus enabling damages caused by the disaster to be kept to a minimum.

Next is a description, in a specific case, of an operation of the disaster predicting apparatus 10. Here, it is assumed to predict a flood and landslide due to rainfall (a downpour).

As shown in Table 1, when hourly precipitation as meteorological observation data exceeds 50 mm per hour, or when the daily precipitation integrated value exceeds 200 mm, it can be considered that there is a likelihood of flood or landslide at that location. Therefore, in order to judge the risk based on the latest high resolution satellite image data, a delivery request for the satellite image data of the area including the location where a disaster is predicted is sent to the most appropriate satellite image provider 20. For the satellite image data, it is desirable to use for example a satellite (for example, a RADARSAT) mounted with a synthetic aperture radar (SAR), that can observe the earth surface even when covered by clouds at night. From the satellite image data of the synthetic aperture radar, it is possible to process floods on the earth surface and terrain changes as image data, using a technique disclosed in Remote Sensing: Principles and Interpretation (1997), Floyd F. Sabins 3rd ed., W. H. Freeman and Company, pp 494.

Of the high resolution satellite image data, SAR images are more practicable, because they enable images on earth to be obtained regardless of the weather or day and night. Although taking images of the earth surface by an optical sensor requires a clear sky and is limited to daytime, information of the earth surface, which is not inferior to aerial photographs, can be obtained. The satellite image provider 20 that received the delivery request for the satellite image data, applies weather prediction data of the area, images of which are to be taken, considers whether it is a clear or cloudy sky and whether it is daytime or nighttime, and obtains the satellite image data from the most appropriate satellite.

Then, on receipt of satellite image data that has been subjected to the position correction and intensity correction, for example, 256 gradation binary data, from the satellite image provider 20, differential image data which takes a difference between this satellite image data and the normal circumstances image data is created. The differential image data represents a difference (change) from the normal circumstances. Hence, an abnormal area where a disaster is predicted can be specified. In the differential image data, for example, pixels for which the level value, being the attribute value, is equal to or below 2 are considered to include errors due to noise. Therefore, for each of the abnormal areas where a disaster is predicted, by adding up the attribute values of the respective pixels, other than the pixels that are considered to include errors due to noise, the abnormal level value showing the risk of disaster is calculated. When the abnormal level value exceeds the predetermined threshold, there is a risk of flood or landslide in the abnormal area. Therefore, an alert is sent to the administrative body 30 having jurisdiction over the area.

Moreover, often disaster reports from disaster sites become important information. When the disaster report is a telephone communication to the jurisdiction administrative body 30, the staff in charge creates the alert mail shown in FIG. 5, to send this to the disaster predicting apparatus 10 via the Internet. At this time, an assumed level value is set for the abnormal level value, and the column for the delivery address code No. is left blank. In the disaster predicting apparatus 10 that received the alert mail, based on the contents of the alert mail, the disaster predicted location and the necessary satellite image data are determined, and a delivery request is made to the satellite image provider 20. Then, in the same way as for the process based on the observation value, the alert mail is sent to the jurisdiction administrative body 30 as required.

If a program which realizes such functions is recorded on computer readable recording media, for example, an IC card, a CD-ROM, a DVD-ROM or the like, the disaster prediction program according to the present invention can be distributed in the market. Then, those who obtain such recording media, can easily construct the disaster predicting apparatus according to the present invention, using a typical computer system.

What is claimed is:

1. A disaster predicting method of sequentially executing:
   a step of sending, when an attribute value of a periodically observed or predicted natural phenomenon exceeds a predetermined threshold, a delivery request for satellite image data of remotely sensed natural phenomenon related to said attribute value in an area including a location where said attribute value is observed or predicted;
   a step of extracting, when delivery of the satellite image data related to said delivery request is received, disaster predicted areas which are predicted to have disasters caused by natural phenomenon related to said attribute value, based on differential image data between said satellite image data and standard satellite image data;
   a step of calculating an index showing the risk of said disaster, for each of the extracted disaster predicted areas, based on attribute values of respective pixels which constitute said differential image data; and
   a step of notifying of a possibility of said disaster in said disaster predicted area, when said index exceeds a predetermined threshold.

2. A disaster predicting method according to claim 1, wherein said step of sending a delivery request for satellite image data, when there is a disaster report from a disaster site, sends a delivery request for satellite image data of remotely sensed natural phenomenon related to said disaster report in an area including a location related to said disaster report.

3. A disaster predicting method according to claim 1, wherein said step of calculating an index showing the risk of disaster, calculates said index by excluding pixels of which attribute values are equal to or less than a predetermined value from among pixels which constitute said differential image data.

4. A disaster predicting method according to claim 1, wherein said step of notifying of a possibility of disaster, sends an alert mail including a disaster type and a position of the disaster predicted area.

5. A disaster predicting method according to claim 4, wherein said step of notifying of a possibility of disaster, sends an alert mail to which is attached said differential image data of an area including said disaster predicted area.

6. A disaster predicting apparatus comprising:
   delivery request sending means for sending, when an attribute value of a periodically observed or predicted natural phenomenon exceeds a predetermined threshold, a delivery request for satellite image data of remotely sensed natural phenomenon related to said attribute value in an area including a location where said attribute value is observed or predicted;
   disaster predicted area extracting means for extracting, when delivery of the satellite image data requested by said delivery request sending means is received, disaster predicted areas which are predicted to have disasters caused by natural phenomenon related to said attribute value, based on differential image data between said satellite image data and standard satellite image data;
   index calculating means for calculating an index showing the risk of said disaster, for each of the disaster predicted areas extracted by said disaster predicted area extracting means, based on attribute values of respective pixels which constitute said differential image data; and disaster notifying means for notifying of a possibility of said disaster in said disaster predicted area, when said index calculated by said index calculating means exceeds a predetermined threshold.

7. A disaster predicting apparatus according to claim 6, wherein said delivery request sending means sends a delivery request for satellite image data, when there is a disaster report from a disaster site, sends a delivery request for satellite image data of remotely sensed natural phenomenon related to said disaster report in an area including a location related to said disaster report.

8. A disaster predicting apparatus according to claim 6, wherein said index calculating means calculates said index by excluding pixels of which attribute values are equal to or less than a predetermined value from among pixels which constitute said differential image data.

9. A disaster predicting apparatus according to claim 6, wherein said disaster notifying means sends an alert mail including a disaster type and a position of the disaster predicted area.

10. A disaster predicting apparatus according to claim 9, wherein said disaster notifying means sends an alert mail to which is attached said differential image data of an area including said disaster predicted area.

11. A disaster predicting program for realizing on a computers comprising:
　a delivery request sending function for sending, when an attribute value of a periodically observed or predicted natural phenomenon exceeds a predetermined threshold, a delivery request for satellite image data of remotely sensed natural phenomenon related to said attribute value in an area including a location where said attribute value is observed or predicted;
　a disaster predicted area extracting function for extracting, when delivery of the satellite image data requested by said delivery request sending function is received, disaster predicted areas which are predicted to have disasters caused by natural phenomenon related to said attribute value, based on differential image data between said satellite image data and standard satellite image data;
　an index calculating function for calculating an index showing the risk of said disaster, for each of the disaster predicted areas extracted by said disaster predicted area extracting function, based on attribute values of respective pixels which constitute said differential image data; and
　a disaster notifying function for notifying of a possibility of said disaster in said disaster predicted area, when said index calculated by said index calculating function exceeds a predetermined threshold.

12. A computer-readable recording medium recorded with a disaster predicting program for realizing on a computer, comprising:
　a delivery request sending function for sending, when an attribute value of a periodically observed or predicted natural phenomenon exceeds a predetermined threshold, a delivery request for satellite image data of remotely sensed natural phenomenon related to said attribute value in an area including a location where said attribute value is observed or predicted;
　a disaster predicted area extracting function for extracting, when delivery of the satellite image data requested by said delivery request sending function is received, disaster predicted areas which are predicted to have disasters caused by natural phenomenon related to said attribute value, based on differential image data between said satellite image data and standard satellite image data;
　an index calculating function for calculating an index showing the risk of said disaster, for each of the disaster predicted areas extracted by said disaster predicted area extracting function, based on attribute values of respective pixels which constitute said differential image data; and
　a disaster notifying function for notifying of a possibility of said disaster in said disaster predicted area, when said index calculated by said index calculating function exceeds a predetermined threshold.

* * * * *

UNITED STATES PATENT AND TRADEMARK OFFICE
CERTIFICATE OF CORRECTION

PATENT NO. : 7,035,765 B2  Page 1 of 1
APPLICATION NO. : 10/341479
DATED : April 25, 2006
INVENTOR(S) : Shuichi Tanahashi It is certified that error appears in the above-identified patent and that said Letters Patent is hereby corrected as shown below:

Column 9, line 26, change "computers" to --computer--

Signed and Sealed this

Seventeenth Day of October, 2006

JON W. DUDAS
*Director of the United States Patent and Trademark Office*